UNITED STATES PATENT OFFICE.

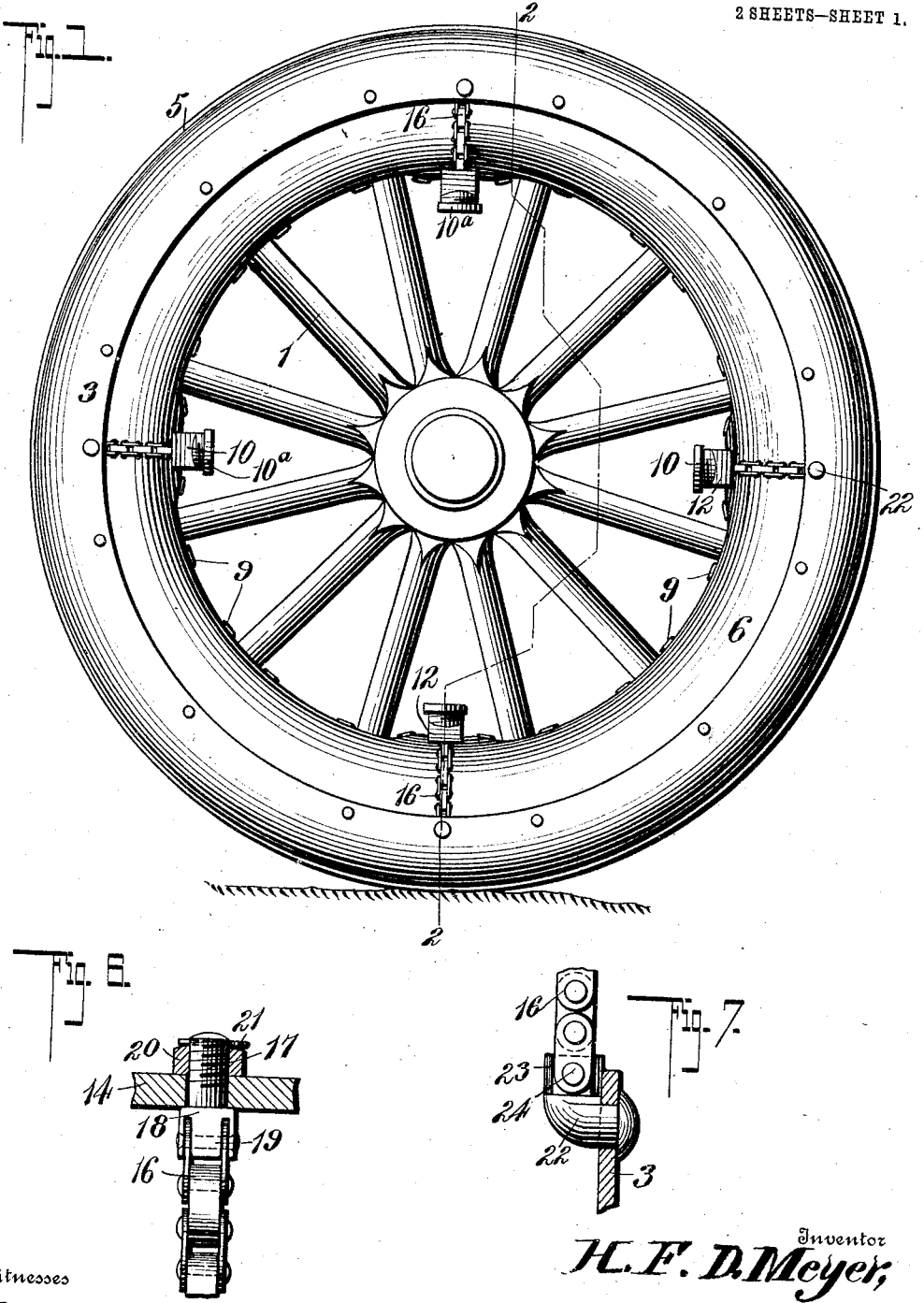

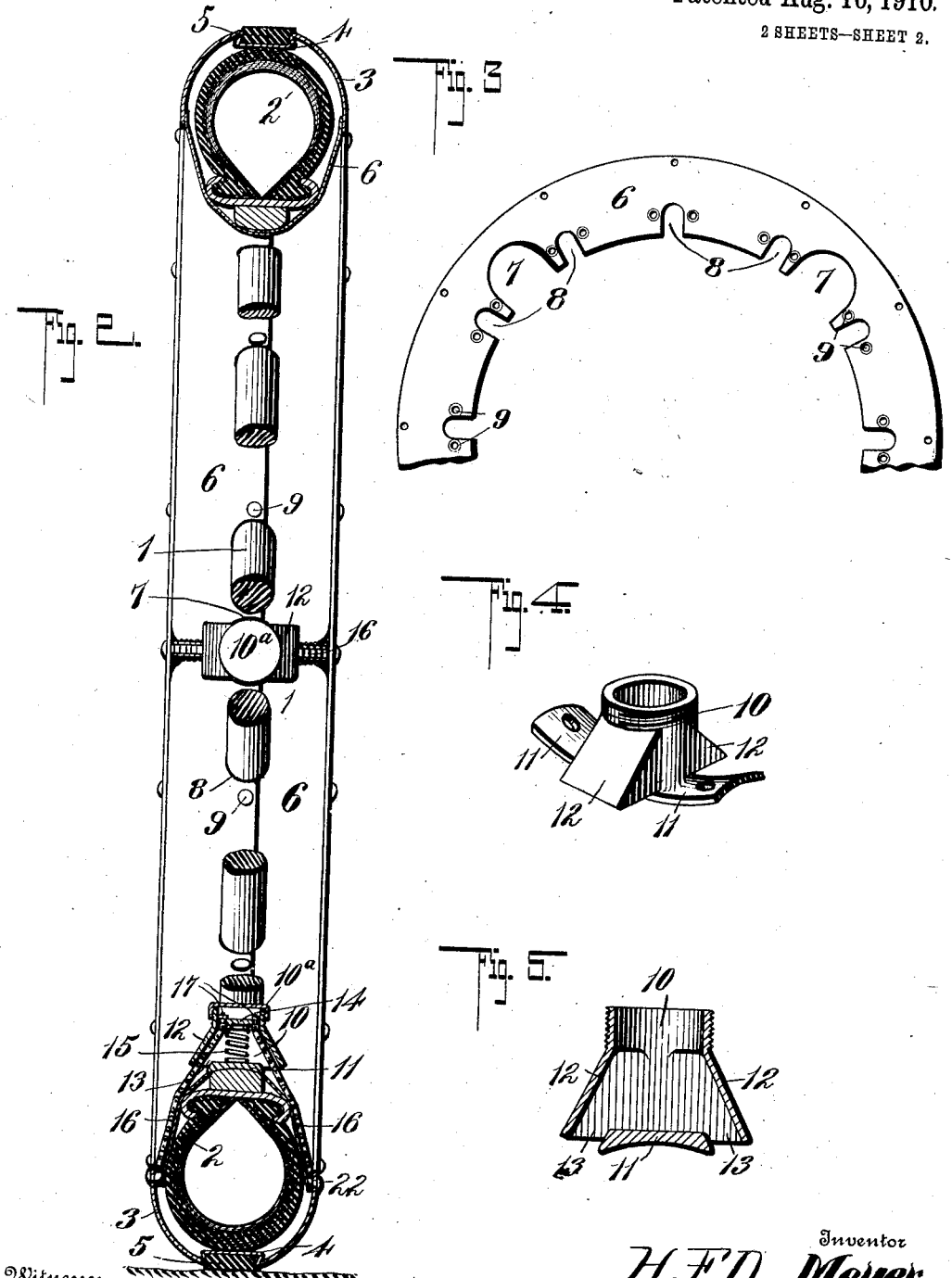

HERMAN F. D. MEYER, OF NEW YORK, N. Y.

TIRE-SHIELD.

967,806.  Specification of Letters Patent.  Patented Aug. 16, 1910.

Application filed September 29, 1908. Serial No. 455,364.

To all whom it may concern:

Be it known that I, HERMAN F. D. MEYER, a citizen of the United States, residing at New York, in the county and State of New York, have invented a new and useful Improvement in Tire-Shields, of which the following is a specification.

This invention relates to a shield for covering and protecting pneumatic tires, shielding them against wear and puncture.

The invention also comprises means for holding said shield in place, together with additional means for permitting spring adjustment of the shield to the tire, thus allowing for inequalities in the roadway, and also for the change in size of the tire at different times due to increase or decrease of the extent to which the said tire is inflated.

A further object of the invention is to permit the use of the tire without having the same inflated to its greatest capacity, thus making the pneumatic tire less rigid and consequently increasing its efficiency as a cushion, and also reducing the liability of a tire bursting.

The invention consists in the novel features of construction, arrangement and combination of parts hereinafter described, pointed out in the claims and shown in the accompanying drawings, in which:—

Figure 1 is a side elevation of a wheel provided with my invention. Fig. 2 is a section on the line 2—2 of Fig. 1. Fig. 3 is a side elevation showing a portion of a sectional cape. Fig. 4 is a detail perspective view of a spring casing, a cap being removed. Fig. 5 is a vertical section through said casing. Figs. 6 and 7 are detail enlarged sectional views illustrating means of attaching opposite end portions of a chain.

In these drawings 1 represents the rear wheel of an automobile provided with a pneumatic tire 2 of any desired make. Fitted over this tire and inclosing its entire tread portion is a shield 4 of any suitable material, the said shield being circular in form and U-shaped in cross section. It will be understood that said shield is placed in position while the tire 2 is in a deflated condition, the tire extending to and partially filling the shield, more or less, as inflated. To prevent skidding and also to insure a firm grip by the drive wheels, the tread portion of the shield 3 is pressed inwardly as shown at 5, thus forming around said tread portion a dove tail slot into which is pressed a solid rubber tire, 5.

In applying my invention to the front wheels of an automobile, I employ the same construction as for the rear wheels except that upon the shields for the front wheels I omit the slot and rubber tire 5. The remaining parts of invention to be now described apply to the invention as applied to both front and rear wheels.

To the shield 3 I rivet a cape 6, said cape being secured to the side edge portions of said shield, and the said cape is formed in two overlapping sections similar to each other in construction. Each section is provided with four or more cut out portions 7 which permit the sections to fit around certain spring casings to be hereafter described, and the cape sections are also notched as shown at 8 to fit around the wheel spokes. In order to fasten the cape sections together, I employ an ordinary glove fastener 9, each section of the cape carrying one of the coöperating members of such fastener adjacent each notch and cut out portion, as indicated in Fig. 3.

It will be obvious that when the tire 2 is inflated to the proper extent and the cape sections are overlapped upon the tire rim and buttoned around the spokes that the said cape sections will hold the shield 3 securely in place without any additional fastening means, and the shield may be applied and put into use if desired without the additional parts hereafter referred to. But in order to further increase the efficiency of the shield, I provide about the wheel rim a number of casings 10, these casings being preferably four in number. The casings 10 have their upper portions threaded and when in use are closed by a cap 10$^a$ threaded upon them. The bottom 11 of the casings is extended upon opposite sides of the casing forming end lugs, as shown in Fig. 4, which lugs are curved to fit the rim of the wheel and are suitably bolted thereto. The sides of the casing adjacent these bottom extensions are squared and flared out as shown at 12, leaving upon opposite sides of the wheel rim chain openings 13. In the upper portion of each casing, which portion is cylindrical in form, is placed a tension plate 14 which works in the upper portion of said casing and which bears upon a coil spring 15 which spring bears in turn upon the bottom of the casing. Chains 16 are pivotally connected at their inner ends to bolts 17 passed through opposite marginal portions of the plates 14, said bolts having squared and slotted heads 18 into the slots of which extend the end links of the chains, pivot pins 19 fastening through said heads and links and pivotally connecting the chains to the bolts. A nut 20 is provided for each bolt 17 and the projecting portion of the bolt is transversely perforated and a cotter pin 21 passes through said perforation and prevents the nuts from being jarred loose. The other ends of the chains are pivotally connected to the shield by means of a rivet 22 provided with an inwardly extending squared reduced end portion 23, at an angle to the body of the rivet, and over these reduced portions fit the end links of the outer ends of the chains, said links being held to said reduced portions by means of pivot pins 24.

By means of this construction, it will be obvious that the chains will connect the shield to the plates 14, which plates in turn are pressed inwardly on a radial line with respect to the wheel by the springs 15, and that said springs will tend to hold the shield closely to the tire, and at the same time will allow the amount of play neces- sary, and which could not be secured if the cape alone was depended upon.

What I claim is:—

1. A device of the kind described comprising a shield inclosing a pneumatic tire, a cape formed in overlapping sections, said sections being secured to the shield and overlapping upon a wheel rim, fastening means carried by the cape, casings carried by the wheel rim, radially arranged springs carried by said casings, radially movable plates bearing against the inner ends of said springs, and chains connected to said plates, said chains running through said casings and being secured to the shield.

2. A device of the kind described comprising a shield inclosing the tread portion of a pneumatic tire, casings carried by a wheel rim, said casings having flared opposite sides providing chain openings, a plate movably held in each casing, a spring in each casing bearing upon said plate and tending to force the same radially toward the wheel hub, and chains running through said chain openings, each chain being pivotally connected at one end to said plate and at the other end to the said shield, as and for the purpose set forth.

HERMAN F. D. MEYER.

Witnesses:
EDWARD F. MEYER,
JOHN C. WATSON.